US012769526B2

(12) United States Patent
Plotnik et al.

(10) Patent No.: US 12,769,526 B2
(45) Date of Patent: Oct. 20, 2026

(54) SYSTEM AND METHOD FOR MAPPING SOURCE CODE COMPONENTS AND RISKS TO RUNTIME

(71) Applicant: APIIRO LTD., Tel Aviv (IL)

(72) Inventors: Idan Plotnik, Herzliya (IL); Eldan Ben-Haim, Kiryat Ono (IL); Ariel Levy, Tel Aviv-Jaffa (IL); Eli Shalom, Tel Aviv-Jaffa (IL)

(73) Assignee: APIIRO LTD., Tel Aviv (IL)

( * ) Notice: Subject to any disclaimer, the term of this patent is extended or adjusted under 35 U.S.C. 154(b) by 304 days.

(21) Appl. No.: 18/224,100

(22) Filed: Jul. 20, 2023

(65) Prior Publication Data

US 2024/0028317 A1 Jan. 25, 2024

Related U.S. Application Data

(60) Provisional application No. 63/391,063, filed on Jul. 21, 2022.

(51) Int. Cl.
*G06F 8/41* (2018.01)
*G06F 8/71* (2018.01)

(52) U.S. Cl.
CPC ................ *G06F 8/443* (2013.01); *G06F 8/71* (2013.01)

(58) Field of Classification Search
CPC .................................. G06F 8/71; G06F 8/443
See application file for complete search history.

(56) References Cited

U.S. PATENT DOCUMENTS

| | | | | |
|---|---|---|---|---|
| 9,213,541 | B2 * | 12/2015 | Araya | G06F 16/8373 |
| 9,419,913 | B2 * | 8/2016 | Ferris | G06F 9/5072 |
| 11,537,400 | B1 * | 12/2022 | Zhang | G06F 8/53 |
| 2012/0180024 | A1 * | 7/2012 | Gonzalez | G06F 8/71<br>717/109 |
| 2016/0139938 | A1 * | 5/2016 | Dimitrakos | G06F 9/44505<br>718/100 |
| 2016/0179502 | A1 * | 6/2016 | Cawley | G06F 8/54<br>717/121 |
| 2018/0324204 | A1 * | 11/2018 | McClory | G06F 9/5027 |
| 2019/0377662 | A1 * | 12/2019 | Mitchell | G06F 11/3624 |
| 2020/0082027 | A1 * | 3/2020 | Haumer | G06F 16/313 |
| 2020/0117427 | A1 * | 4/2020 | McGloin | G06F 8/30 |
| 2021/0064347 | A1 * | 3/2021 | Junior | G06F 8/30 |
| 2023/0164148 | A1 * | 5/2023 | Narayan | H04L 63/1441<br>726/13 |

OTHER PUBLICATIONS

Notice of Deficiencies From IL 304639 Mailed on Nov. 6, 2025.

* cited by examiner

*Primary Examiner* — Phillip H Nguyen
(74) *Attorney, Agent, or Firm* — Rivka Friedman

(57) ABSTRACT

A method for mapping source code to computation resource, the method including the steps of: determining computation resources of a cloud provider used by an application; identifying executable artifacts that are deployed on the computation resources; and matching executable artifacts to source-code and configuration content to provide artifact to code or configuration matches.

11 Claims, 1 Drawing Sheet

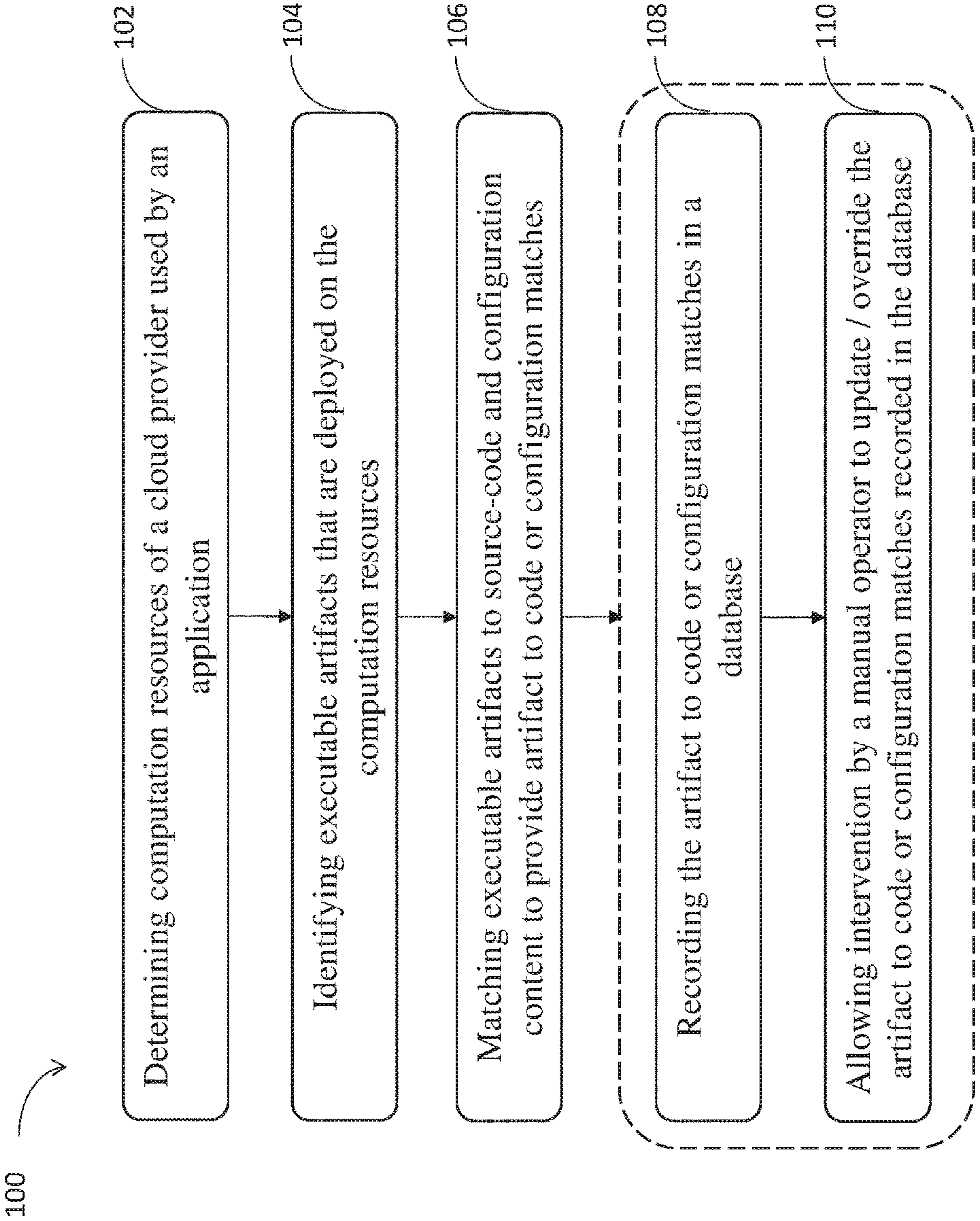
100
102
Determining computation resources of a cloud provider used by an application
104
Identifying executable artifacts that are deployed on the computation resources
106
Matching executable artifacts to source-code and configuration content to provide artifact to code or configuration matches
108
Recording the artifact to code or configuration matches in a database
110
Allowing intervention by a manual operator to update / override the artifact to code or configuration matches recorded in the database

SYSTEM AND METHOD FOR MAPPING SOURCE CODE COMPONENTS AND RISKS TO RUNTIME

This patent application claims the benefit of, and priority from, U.S. Provisional Patent Application No. 63/391,063, filed Jul. 21, 2022, which is incorporated in its entirety as if fully set forth herein.

FIELD OF THE INVENTION

This invention relates to identifying source-code and configuration materials that affect the function of specific components in a cloud-native application's infrastructure, and, conversely, identifying all infrastructure components that run code built from, are created based on, or otherwise function in a way that is affected by, specific source-code or configuration files.

BACKGROUND OF THE INVENTION

Cloud-native applications are typically composed of a heterogeneous collection of components such as code artifacts, services, APIs, and infrastructure components. Analyzing the attack surface of cloud-native applications to find vulnerabilities and security risks involves looking at this entire collection of components. Moreover, identifying some vulnerabilities or risks requires that multiple components be considered along with the relationships between them.

SUMMARY OF THE INVENTION

According to the present invention there is provided a method for mapping source code to computation resource, the method including the steps of: determining computation resources of a cloud provider used by an application; identifying executable artifacts that are deployed on the computation resources; and matching executable artifacts to source-code and configuration content to provide artifact to code or configuration matches.

According to further features the step of identifying executable artifacts includes identifying contained artifacts that are embedded in the executable artifacts.

According to further features the method further includes obtaining content of all or parts of the physical or virtual storage devices used by the computation resources and metadata about the computation resources.

According to further features the method further includes monitoring build processes of the source-code that generate the executable artifacts.

According to further features the step of matching executable artifacts includes generating candidate matches and assigning a confidence score to each of the candidate matches, the confidence score indicates a likelihood of being an actual match.

According to further features the method further includes the step of: employing an optimization algorithm that selects a matching that maximizes the overall or total confidence score, while not including contradicting matches.

According to further features the candidate matches are generated using a Name-based Matching of Artifact To Code mechanism wherein names of artifacts are compared against exact or approximate names of modules and repositories, and exact or approximate names of generated artifacts as they are expressed in build and project files within the modules and repositories.

According to further features the candidate matches are generated using an Artifact Metadata-based Matching To Code mechanism wherein artifact metadata is obtained from at least one source of the group of sources including: an executable header, an executable version information resource; an executable-embedded manifest; a manifest file alongside an executable artifact; and artifacts managed in an artifact repository; and wherein the artifact metadata is used to match to repositories based on predefined rules.

According to further features the candidate matches are generated using a Dependency Fingerprint-based Matching To Code mechanism, wherein a respective fingerprint is created including dependencies of each artifact of the executable artifacts and comparing the fingerprint to declared dependencies declared for modules in the source-code.

According to further features the candidate matches are generated using a Symbol-based Matching of Artifact To Code mechanism wherein at least one of: class names, exported functions, and internal symbols present in executable artifacts, are compared to a list of symbols devised from the source-code.

According to further features the step of matching executable artifacts includes generating candidate matches using a Build Process Tracking for Matching Artifact to Code mechanism wherein the build process in a continuous integration and continuous delivery/continuous deployment (CI/CD) is monitored to identify potential names of the executable artifacts.

According to further features the method further includes the steps of: recording the artifact to code or configuration matches in a database; and allowing intervention by a manual operator to update or override the artifact to code or configuration matches recorded in the database.

BRIEF DESCRIPTION OF THE DRAWINGS

Various embodiments are herein described, by way of example only, with reference to the accompanying drawing, wherein:

FIG. 1 is a flow diagram of a process according to an embodiment of the invention.

DESCRIPTION OF THE PREFERRED EMBODIMENTS

The principles and operation of a system and method for mapping source code components and risks to runtime according to the present invention may be better understood with reference to the drawing and the accompanying description.

The invention provides multiple approaches to associate infrastructure components with affecting source-code and configuration materials. Referring now to the drawings, FIG. 1 illustrates a flow diagram 100 of a process according to an embodiment of the invention. Common to these methods is the following principal process:

1. Step 102—Discovery and inspection of various infrastructure/computation resources,
2. Step 104—Identifying executable artifacts that are deployed thereon,
3. Step 106—Matching executable artifacts to source-code and configuration content.
4. Step 108—Recording the aforementioned matching in a database.

5. Step 110—Allowing intervention by a manual operator to update or override some matches recorded in the database.

The different approaches included in this invention differ from each other primarily in how they execute Step 3 above; namely, how exactly the matching occurs between executable artifacts and the code that produced them.

By identifying the source-code and configuration content that is used to build executable code that is running on infrastructure resources, information about those resources—such as the level of their exposure to external communication, and relations among them—can be leveraged to add context when inspecting the application for vulnerabilities and security risks.

The terms 'computation resources' and 'infrastructure computation resources' are used interchangeably herein. Infrastructure computation resources are therefore often simply referred to as computation resources, and within that context, may be further simplified to just 'resources'.

There is presented a comprehensive mechanism that discovers and normalizes representation of resources within cloud-native applications. By combining querying, static analysis, and runtime analysis, the system can effectively identify resources and handle them, regardless of their source.

Discovery and Inspection

Discovery of computational resources in a cloud infrastructure environment can be achieved by one or more of the following methods:

1. Using the management API (Application Programming Interface) of a cloud provider to enumerate resources and obtain metadata about the computational resources, it is possible to obtain a list of compute resources such as clusters, compute nodes, serverless functions, etc.
2. For clusters managed using a cluster orchestration stack such as Kubernetes or similar platforms, the cluster orchestration platform management API can be invoked to enumerate resources in the cluster.
3. By deploying executable code on each new computation resource provisioned (the "discovery agent"), the agent can then inspect the computation resource on which it is running and report its results via network to a central processor.

Hybrid solutions will utilize multiple approaches from the list above to cover an entire infrastructure portfolio. For instance, a management API of a cloud provider can be used to identify Kubernetes clusters deployed on the cloud which are, in turn, introspected using the Kubernetes management API to identify compute nodes within the cluster. In parallel, serverless nodes are identified by the same management API.

Identifying Executable Artifacts

Once computation nodes are identified and information about them is fetched, executable artifacts that are run by them are identified. Executable artifacts are best modeled as a containment hierarchy—often artifacts may have other artifacts embedded in them. Therefore, in some embodiments, identifying executable artifacts includes identifying contained artifacts that are embedded in the executable artifacts. Identifying these contained artifacts and the containment hierarchy can boost the performance of the matching process. For example, for Kubernetes clusters, Pod computing resources may run Containers that, in turn, load a Container Image and execute that. The Container Image can be fetched from a Container Registry and inspected for content to identify finer-grained artifacts such as executable files launched by the image. Other Container-based technologies such as managed container services can be processed in a similar method.

In embodiments, the system monitors the build processes of the source-code that generate the executable artifacts. This monitoring can be useful in matching names of executable artifacts to source-code that was used in the build processes.

In addition to listing the executable artifacts deployed on the various infrastructure computation resources, obtaining their content, and metadata about them, is also valuable for the matching process.

Matching Executable Artifacts

Once a population of executable artifacts is identified, a target set of repositories and fragments thereof (called Modules) is identified. Then, a process for matching between artifacts and the target set is carried out. At the heart of this process are several techniques that allow identifying matches (or mismatches) between artifacts and code. These techniques can be employed in various configurations, including:

1. A global match competition: candidate matches are generated based, among other options, on one or more of the mechanisms outlined below. Each candidate match bears a confidence score that identifies how likely that match is. Finally, an optimization algorithm selects a matching that maximizes the overall or total confidence score, while not including contradicting matches.
2. A matching method competition: A single matching technique is employed at a time, and the technique yielding the highest confidence matches is selected. Optionally, if there are code or computation resource nodes that remain uncovered, the next-best matching method can be used to try to match those, and so on.
3. Reinforced matching: Multiple matching techniques are employed, and matches are only included in the final result if more than one technique vetted the match.

Name-Based Matching of Artifact to Code

In this technique, the names of artifacts are compared against the following:

1. Names of modules and repositories.
2. Names of generated artifacts as they are expressed in build and project files within modules and repositories.

Comparison should take into account some name-derivation patterns such as:

1. Changing character case.
2. Common prefixes and suffixes. These could be of global applicability (e.g., -server, -api, -main) or applicable to a specific organization or system (e.g., <system-name>-).
3. Snake-case, camel-case and similar identifier naming convention transforms.
4. Omission of some words or prepositions from names.
5. Inclusion of a version-identification suffix in the artifact name.

Artifact Metadata-Based Matching to Code

In this technique, artifact metadata is obtained from the following sources:

1. Executable header
2. Executable version information resource
3. Executable-embedded manifest
4. Manifest file alongside the executable
5. For artifacts managed in an artifact repository—any metadata available in the repository on the artifact The metadata may be used to match to repositories based on the following logic:

1. Metadata may refer to a URL that identifies a repository.
2. Metadata may refer to the name of a repository or module. Here again name matching should follow the same logic described above for name matching, ignoring some common transforms.

Dependency Fingerprint-Based Matching to Code

Artifacts often depend on other artifacts—for example dynamic link libraries, shared objects or JAR files. By creating a fingerprint that consists of the dependencies of an artifact and comparing it to the declared dependencies declared for some modules in code, matching can be performed. The fingerprint may or may not include dependency version information, and the matching should allow for some discrepancies. “Ambient” dependencies such as OS provided API libraries can be eliminated from the computation.

Symbol-Based Matching of Artifact to Code

Class names, exported functions and internal symbols present in an artifact may be compared to a list of symbols as devised from source code. This comparison does not have to encompass all symbols in the source and target; it is enough that it focuses on a set of distinct anchor symbols. The set of anchor symbol names can be generated by identifying symbol names unique to a module or repository. Symbol names are identified through parsing source-code files using a parser adapted to identify declarations in target programming languages that are compiled into symbols. In some languages techniques that transform the symbol as it appears in source-code declaration to the predicted symbol name in a binary should be applied (for example name mangling in C++).

Build Process Tracking for Matching Artifact to Code

By monitoring build process in continuous integration and continuous delivery/continuous deployment (CI/CD) systems, either in real-time or by inspecting build result logs, it is sometimes possible to identify artifact names that are built and from which repository or module they were built. Real-time inspection may be implemented based on instrumentation of the build system to track file operations, or using integration APIs specifically tailored for that purpose. Log inspection can be done by either fetching logs using an agent on the build machine or accessing logs through an API. Finally, some CI/CD systems allow invoking custom build steps; such a build step may be used to report the build source and target artifact.

Example of Matching Process

To illustrate the process described above, we now review how it would be executed on a system S that is deployed on two containers in a cloud provider. The containers run two image files, each implementing a microservice. The first image file is named FrontendService and the second one is named AnalyticsService. We further assume that each image is built from its own code repository—Certibig and Analytics, respectively. Also assume that there is an additional code repository, called Service.

With this theoretical system, the process starts by identifying the running containers through cloud provider API calls. This stage would identify the two containers (or more) running images FrontendService and AnalyticsService. Various matching options are now generated by the algorithm, based on the methods described above and assigned a confidence score:

Match AnalyticsService to Analytics based on naming (dropping common suffix ‘Service’). Confidence: 80

Match AnalyticsService to Service based on naming (reducing confidence due to common term ‘Service’). Confidence: 60

Match FrontendService to Service based on naming (reducing confidence due to common term ‘Service’). Confidence: 60

Inspection of image FrontendService reveals that it runs an executable called certibig. Based on executable name, we match FrontendService to Certibig with confidence 80.

Given the suggestions above, the system eventually identifies AnalyticsService is being based on the Analytics repository, and FrontendService based on the Certibig repository.

While the invention has been described with respect to a limited number of embodiments, it will be appreciated that many variations, modifications and other applications of the invention may be made. Therefore, the claimed invention as recited in the claims that follow is not limited to the embodiments described herein.

What is claimed is:

1. A computer-implemented method for mapping source code to computation resource, the method comprising the steps of:

using one or more processors to query cloud-provider metadata or management APIs to determine computation resources of a cloud provider used by an application;

identifying, by the one or more processors, executable artifacts that are deployed on the computation resources; and matching, by the one or more processors, executable artifacts to source-code and configuration content to provide artifact to code or configuration matches, wherein the matching comprises:

generating a plurality of candidate matches between the executable artifacts and the source-code and configuration content; and assigning a confidence score to each of the candidate matches, the confidence score indicating a likelihood of being an actual match.

2. The method of claim 1, wherein the step of identifying executable artifacts includes identifying contained artifacts that are embedded in the executable artifacts.

3. The method of claim 1, further including obtaining content of all or parts of physical or virtual storage devices used by the computation resources and metadata about the computation resources.

4. The method of claim 1, further comprising:

monitoring build processes of the source-code that generate the executable artifacts.

5. The method of claim 1, further comprising the step of:

employing an optimization algorithm that selects a matching that maximizes the overall or total confidence score, while not including contradicting matches.

6. The method of claim 1, wherein the candidate matches are generated using a Name-based Matching of Artifact To Code mechanism wherein names of artifacts are compared against exact or approximate names of modules and repositories, and exact or approximate names of generated artifacts as they are expressed in build and project files within the modules and repositories.

7. The method of claim 1, wherein the candidate matches are generated using an Artifact Metadata-based Matching To Code mechanism wherein artifact metadata is obtained from at least one source of the group of sources including: an executable header, an executable version information resource; an executable-embedded manifest; a manifest file alongside an executable artifact; and artifacts managed in an artifact repository; and wherein the artifact metadata is used to match to repositories based on predefined rules.

8. The method of claim 1, wherein the candidate matches are generated using a Dependency Fingerprint-based Matching To Code mechanism, wherein a respective fingerprint is created including dependencies of each artifact of the executable artifacts and comparing the fingerprint to declared dependencies declared for modules in the source-code.

9. The method of claim 1, wherein the candidate matches are generated using a Symbol-based Matching of Artifact To Code mechanism wherein at least one of: class names, exported functions, and internal symbols present in executable artifacts, are compared to a list of symbols devised from the source-code.

10. The method of claim 4, wherein the step of matching executable artifacts includes generating candidate matches using a Build Process Tracking for Matching Artifact to Code mechanism wherein the build process in a continuous integration and continuous delivery/continuous deployment (CI/CD) system is monitored to identify potential names of the executable artifacts.

11. The method of claim 1, further comprising the steps of:

recording the artifact to code or configuration matches in a database; and allowing intervention by a manual operator to update or override the artifact to code or configuration matches recorded in the database.

* * * * *